（12） United States Patent
Wu

(10) Patent No.: US 7,659,930 B2
(45) Date of Patent: Feb. 9, 2010

(54) EDGE ENHANCEMENT METHOD AND APPARATUS FOR BAYER IMAGES, AND COLOR IMAGE ACQUISITION SYSTEM

(75) Inventor: Cheng-Yu Wu, Hsin Chu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 590 days.

(21) Appl. No.: 11/417,040

(22) Filed: May 4, 2006

(65) Prior Publication Data

US 2006/0250655 A1 Nov. 9, 2006

(30) Foreign Application Priority Data

May 9, 2005 (TW) .............................. 94114840 A

(51) Int. Cl.
*H04N 3/14* (2006.01)
*H04N 5/335* (2006.01)
*H04N 9/04* (2006.01)
*H04N 9/083* (2006.01)

(52) U.S. Cl. .................... 348/280; 382/266; 358/525

(58) Field of Classification Search .............. 348/222.1, 348/234, 252, 253, 625, 627, 630, 631, 280; 382/167, 255, 260, 266–269; 358/2.1, 3.27, 358/48, 525
See application file for complete search history.

(56) References Cited

U.S. PATENT DOCUMENTS

| | | | |
|---|---|---|---|
| 4,580,160 A * | 4/1986 | Ochi et al. .................. 348/276 |
| 6,192,162 B1 | 2/2001 | Hamilton, Jr. et al. |
| 6,774,943 B1 | 8/2004 | Kao et al. |
| 6,816,193 B1 * | 11/2004 | Kohashi et al. ............. 348/234 |
| 7,274,828 B2 * | 9/2007 | Wang et al. ................. 382/266 |
| 7,301,573 B2 * | 11/2007 | Park et al. ................... 348/252 |
| 7,352,396 B2 * | 4/2008 | Okada ........................ 348/252 |
| 7,352,896 B2 * | 4/2008 | Rantanen et al. ........... 382/167 |
| 7,433,534 B2 * | 10/2008 | Kawakubo ................. 382/266 |
| 7,474,337 B1 * | 1/2009 | Cooper .................... 348/222.1 |
| 2004/0227824 A1 * | 11/2004 | Takahashi ................... 348/234 |
| 2005/0025380 A1 * | 2/2005 | Keshet et al. ............... 382/260 |
| 2005/0231603 A1 * | 10/2005 | Poon ..................... 348/208.99 |
| 2006/0020203 A1 * | 1/2006 | Tamura ...................... 600/437 |

* cited by examiner

*Primary Examiner*—Lin Ye
*Assistant Examiner*—Dennis Hogue
(74) *Attorney, Agent, or Firm*—Muncy, Geissler, Olds & Lowe, PLLC

(57) ABSTRACT

An edge enhancement method and apparatus for Bayer images are provided. The apparatus stores the raw Bayer image data into a line buffer. After having directly read the raw Bayer image data from the buffer, the apparatus computes luminance characteristic values, analyzes the edge characteristic and then outputs the edge characteristic values. According to the edge characteristic values, the edges in the raw Bayer image data are enhanced. The apparatus simplifies the processing complexity of the rear-stage circuit by directly enhancing the edges in the Bayer image, and is easily combined with the post image processing mechanism. Conventionally, the raw Bayer image is converted to the RGB image or the YUV image and then the edge enhancement operation is performed. The invention reduces the computing volume and memory size. Also, performing the edge enhancement operation in advance helps to identify the interpolation direction and ease the annoying noise.

14 Claims, 7 Drawing Sheets

EDGE ENHANCEMENT METHOD AND APPARATUS FOR BAYER IMAGES, AND COLOR IMAGE ACQUISITION SYSTEM

This application claims the benefit of the filing date of Taiwan Application Ser. No. 094114840, filed on May 9, 2005, the content of which is incorporated herein by reference.

BACKGROUND OF THE INVENTION

1. Field of the Invention

The present invention generally relates to the field of digital signal processing and, more specifically to an edge enhancement method and apparatus for Bayer images.

2. Description of the Related Art

Generally, three image sensors are required to respectively record three color values for each pixel to display the true color of an object. In order to reduce the circuit size and the cost of hardware, a majority of the image acquisition systems simply utilize a single image sensor overlaid by a color filter array. Consequently, they capture only one color for each pixel, so that it is required to reconstruct missing color values for each pixel. FIG. 1A is a diagram of the Bayer geometry for a color filter array.

FIG. 1B is a block diagram of a conventional image acquisition system. Referring to FIG. 1B, the image acquisition system 100 includes an image acquisition unit 101, a buffer 103, an interpolator 104, a color correction unit 105, a gamma correction unit 106, an RGB to YUV converter 107 and an edge enhancement unit 108, wherein "Y" represents a luminance signal and "UV" represents a chrominance signal.

The image acquisition system 100 uses the image acquisition unit 101 to capture image data and generate the raw Bayer image data, then stores the image data into the buffer 103. The interpolator 104 receives the raw Bayer image data output from the buffer 103, generates the missing color values for each pixel by using interpolation or other algorithms, and outputs the RGB image data. The color correction unit 105 receives the RGB image data and performs the color correction. The gamma correction unit 106 performs the gamma correction on the image data output from the color correction unit 105. The RGB to YUV converter 107 converts the RGB three color values into the YUV three color values for each pixel and then outputs the YUV image data.

The clarity of the image captured by the image acquisition unit 101 varies according to the sensitivity and the resolution of the photosites. Generally, there is an edge enhancement unit 108 embedded in the image acquisition system 100 for performing image edge enhancement and enhancing the clarity of the image.

In U.S. Pat. No. 6,192,162, Hamilton, Jr., et al. discloses a method for edge enhancement of a digital image. The method computes a luminance value using RGB three color values, or simply uses the green channel of the image to compute parameters in each orientation for each respective pixel. Depending on surrounding parameters, each pixel in the image is classified if the pixel neighborhood contains any edges in the luminance record or if the pixel neighborhood is in a "flat" region of the image. For the "un-flat" classification, an edge boost kernel is adaptively chosen based on edge orientation. If only the green channel of the image is used to determine the pixel classification, the sharpening processes amplify noise as well as image content because the green channel is not fully representative of the luminance value. Instead, if the pixel classification is to be determined by luminance values, the missing color values are initially reconstructed (or interpolated) so that each pixel contains three full color values. Then three full color values for each pixel are converted to the luminance domain for the edge classification and the edge enhancement.

In U.S. Pat. No. 6,774,943, Kao et. al. teaches a method and apparatus for edge enhancement of a digital image. An edge value is assigned to each pixel in an image in accordance with a difference in luminance between that pixel and neighboring pixels. The edge value for each pixel is scaled and then combined with the original luminance value of the pixel to provide an enhanced value for edge enhancement.

However, the two above-mentioned methods are all applied to the interpolated image data; therefore, it consumes a large amount of memory space and causes delays in timing to compute the luminance values and classification of the edge content.

SUMMARY OF THE INVENTION

In view of the above-mentioned problems, an object of the invention is to provide an edge enhancement method and apparatus for Bayer images. It saves memory access space by directly performing the edge enhancement on the raw Bayer image data.

To achieve the above-mentioned object, the edge enhancement apparatus for Bayer images of the present invention comprises a buffer, a luminance characteristic value generating unit, an edge analyzing unit and an edge enhancement unit. The buffer receives the raw Bayer image data and stores the data temporarily. After having received the raw Bayer image data output from the buffer, the luminance characteristic value generating unit generates a luminance characteristic value for each pixel. The edge analyzing unit analyzes and determines if an edge characteristic and an edge orientation exist in the interested pixel in accordance with the luminance characteristic values of each interested pixel and neighboring pixels. The edge enhancement unit receives the raw Bayer image data, enhances the pixel values in the edge orientation of the interested pixel, and outputs edge-enhanced Bayer image data if an edge characteristic exists in the interested pixel. On the contrary, the edge enhancement unit directly outputs the raw Bayer image data if no edge characteristic exists in the interested pixel.

Compared to the prior arts which perform the edge enhancement on the interpolated image data, the invention directly performs the edge enhancement on the raw Bayer image data to simplify the processing complexity of the rear-stage circuit. The invention not only easily combines with the post image processing mechanism, but also has less requirements for the related hardware. Further, the noise of the edge-enhanced Bayer image data is dramatically decreased.

The foregoing and other objects, features, aspects and advantages of the present invention will become better understood from a careful reading of a detailed description provided herein below with appropriate reference to the accompanying drawings.

DETAILED DESCRIPTION OF THE INVENTION

Figure 2:
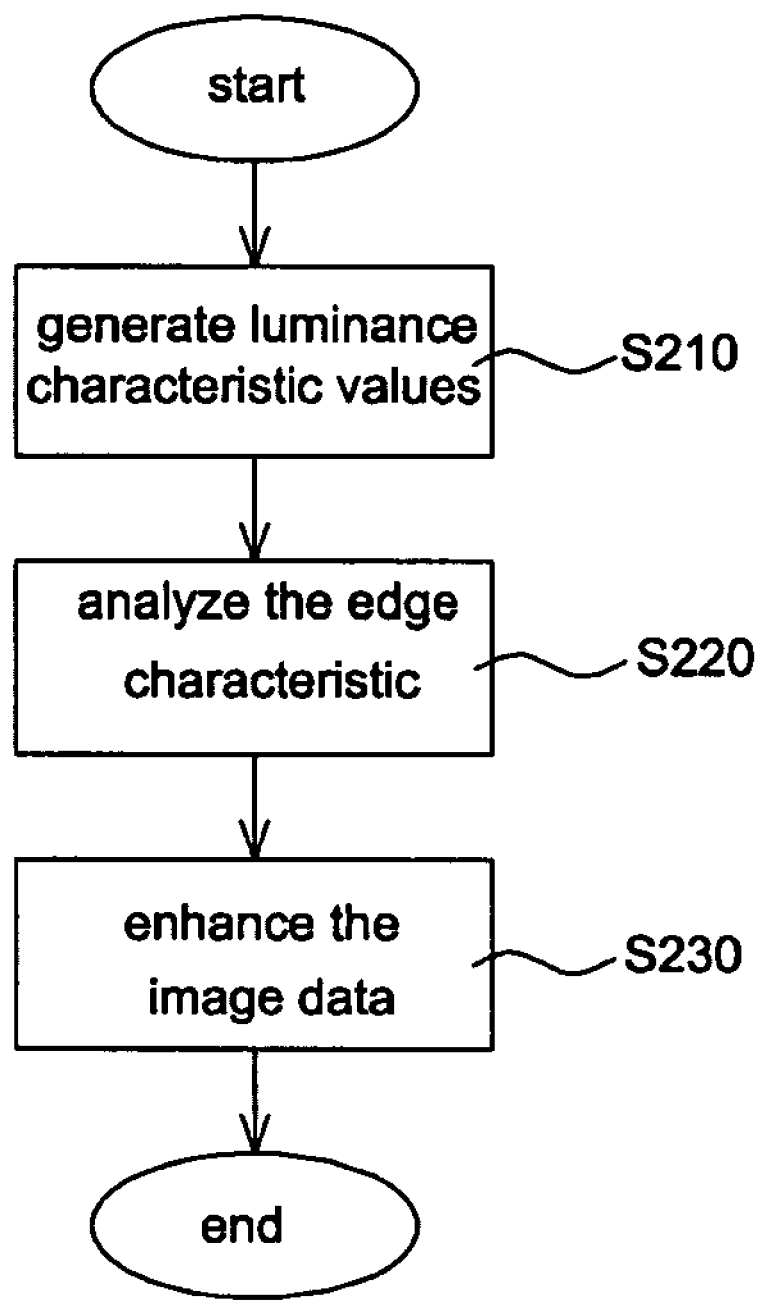
FIG. 2 is a flow chart illustrating the edge enhancement method for Bayer images according to the present invention.

FIG. 2 is a flow chart illustrating the edge enhancement method for Bayer images according to the present invention. Referring to FIG. 2, the edge enhancement method for Bayer images is detailed as follows:

STEP S210: Generate luminance characteristic values. The raw Bayer image data is read from a buffer, and the luminance characteristic value for each pixel is calculated.

STEP S220: Analyze the edge characteristic. According to the luminance characteristic values of each interested pixel and neighboring pixels, it is analyzed if an edge characteristic and an edge orientation exist in the interested pixel.

STEP S230: Enhance the image data. After having received the raw Bayer image data is received from the buffer, the pixel values in the edge orientation of the interested pixel are enhanced if the edge characteristic does exist in the interested pixel. Accordingly, the edge-enhanced Bayer image data is output. However, if an edge characteristic doesn't exist in the interested pixel, there is no operation applied to the raw Bayer image data.

In STEP S210, a matrix filter is applied to the interested pixel and neighboring pixels to generate the luminance characteristic value for each pixel. For example, the matrix filter is implemented with the following 3×3 matrix:

$$\begin{bmatrix} 1 & 2 & 1 \\ 2 & 4 & 2 \\ 1 & 2 & 1 \end{bmatrix}.$$

Therefore, a luminance characteristic value for the central pixel of a 3×3 array of the raw Bayer image data is obtained by means of multiplying the 3×3 array of the raw Bayer image data by the matrix filter and averaging the determinant (dividing the determinant by 16 in this embodiment).

In STEP S220, a horizontal edge matrix filter and a vertical edge matrix filter are applied to the luminance characteristic values of the interested pixel and neighboring pixels to generate a vertical edge characteristic value and a horizontal edge characteristic value of the interested pixel respectively. For example, the horizontal edge matrix filter is implemented with the following 3×3 matrix:

$$\begin{bmatrix} 1 & 2 & 1 \\ 0 & 0 & 0 \\ -1 & -2 & -1 \end{bmatrix}, \text{ and}$$

and the vertical edge matrix filter is implemented with the following 3×3 matrix:

$$\begin{bmatrix} -1 & 0 & 1 \\ -2 & 0 & 2 \\ -1 & 0 & 1 \end{bmatrix}.$$

Hence, after the luminance characteristic values with the 3×3 array are multiplied by the horizontal edge matrix filter and the vertical edge matrix filter respectively, both determinants are computed. The results are a horizontal characteristic value and a vertical edge characteristic value for the central pixel with a 3×3 array of the raw Bayer image data. Thus, comparisons are respectively made between the horizontal edge characteristic value and a threshold value, and between the vertical edge characteristic value and the threshold value. If the horizontal edge characteristic value is greater than the threshold value, an edge characteristic exists in the interested pixel and it is a horizontal edge. On the other hand, if the vertical edge characteristic value is greater than the threshold value, an edge characteristic exists in the interested pixel and it is a vertical edge. However, there is no edge characteristic existing in the interested pixel if both the vertical characteristic value and the horizontal edge characteristic value are less than the threshold value.

In STEP S230, the invention uses an edge enhancement filter to enhance corresponding pixel values in the edge orientation of the interested pixel. For example, the edge enhancement filter is implemented with the following 1×5 matrix:

$$\begin{bmatrix} -\frac{1}{2} & 0 & 1 & 0 & -\frac{1}{2} \end{bmatrix}.$$

When the edge enhancement filter is applied to the interested pixel for edge enhancement, it is performed by multi-pipeline in order to accomplish the operation in a predetermined time interval (e.g. one clock period). For example, 5 pixel values including the interested pixel value are read from the buffer at the same time and then multiplied by the above-mentioned 1×5 matrix. The enhanced pixel values are finally generated.

Figures 1A, 1B:
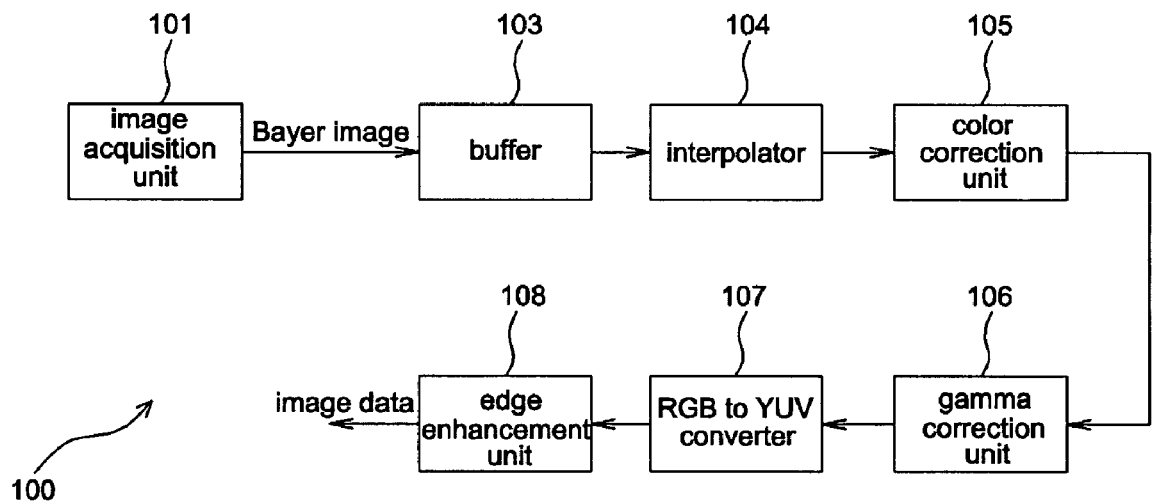
FIG. 1A is a diagram of the Bayer geometry for a color filter.
FIG. 1B is a block diagram of a conventional image acquisition system.

According to the invention, the edge enhancement filter can be applied to one of three stages in image processing pipeline (shown in FIG. 1B) to enhance corresponding pixel values in the edge orientation of the interested pixel in different stage. Stage 1: Apply the edge enhancement filter to the Bayer color filter array image. At this stage, there is only one color component for each pixel. Stage 2: Apply the edge enhancement filter to the RGB image data. At this stage, there are three full color components, which are R, G, B, for each pixel. Stage 3: Apply the edge enhancement filter to the YUV image data. At this stage, there are also three full color components, which are Y, U, V, for each pixel. By applying the edge enhancement filter to any one of three stages, the invention can achieve the edge enhancement effect. Furthermore, as compared to prior arts, the computing volume derived from applying the edge enhancement filter to each stage is decreased, and no extra buffer is needed during computation. However, the edge enhancement operation performed at Stage 1 gains advantages of the least computing volume, being conductive to identify the direction of the subsequent interpolation and being easing the noise of image.

Figure 3:
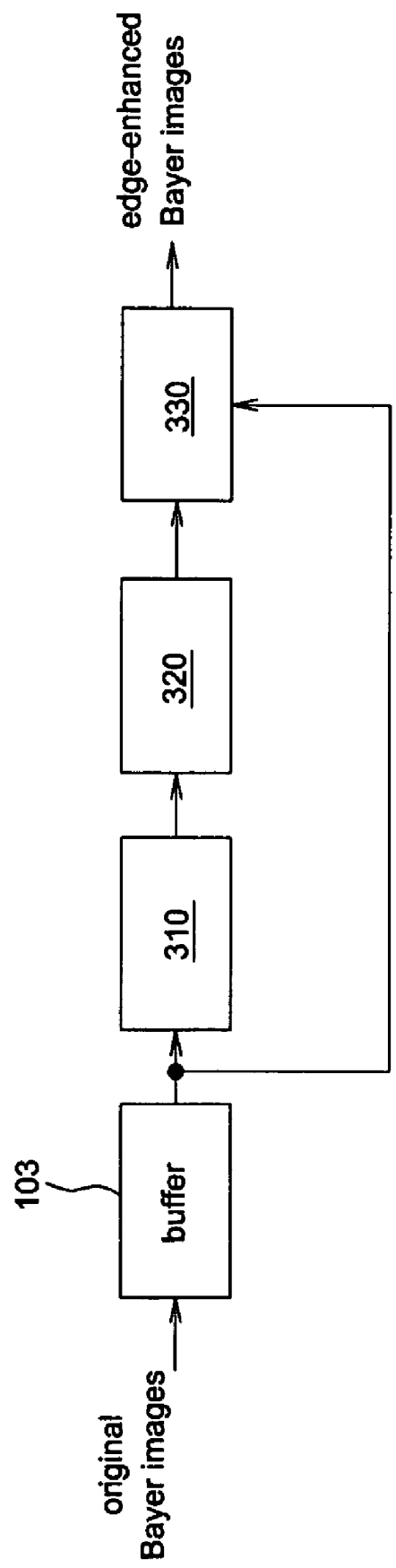
FIG. 3 shows a schematic view of the structure of an edge enhancement apparatus for Bayer images according to the invention.

FIG. 3 shows a schematic view of the structure of an edge enhancement apparatus for Bayer images according to the invention. As shown in FIG. 3, the edge enhancement apparatus 300 includes a buffer 103, a luminance characteristic value generating unit 310, an edge analyzing unit 320 and an edge enhancement unit 330.

The buffer 103 receives the raw Bayer image data and stores the data temporarily. After having read the raw Bayer image data from the buffer 103, the luminance characteristic value generating unit 310 generates a luminance characteristic value for each pixel. The edge analyzing unit 320 analyzes and determines if an edge characteristic and an edge orientation exist in the interested pixel in accordance with the luminance characteristic values of each interested pixel and neighboring pixels. The edge enhancement unit 330 enhances the pixel values in the edge orientation of the interested pixel, and outputs edge-enhanced Bayer image data if an edge characteristic exists in the interested pixel.

The luminance characteristic value generating unit 310 applies a matrix filter to each interested pixel and its neighboring pixels in order to generate a luminance value for each pixel. For example, the matrix filter is implemented with the following 3×3 matrix:

$$\begin{bmatrix} 1 & 2 & 1 \\ 2 & 4 & 2 \\ 1 & 2 & 1 \end{bmatrix}.$$

Therefore, a luminance characteristic value for the central pixel of a 3×3 array of the raw Bayer image data is obtained by means of multiplying the 3×3 array of the raw Bayer image data by the matrix filter and averaging the determinant (dividing the determinant by 16 in this embodiment).

There are several ways to implement the edge analyzing unit 320. For example, a horizontal edge matrix filter and a vertical edge matrix filter are used to generate a horizontal edge characteristic value and a vertical edge characteristic value for the interested pixel respectively. For instance, the horizontal edge matrix filter is implemented with the following 3×3 matrix:

$$\begin{bmatrix} 1 & 2 & 1 \\ 0 & 0 & 0 \\ -1 & -2 & -1 \end{bmatrix}, \text{ and}$$

and the vertical edge matrix filter is implemented with the following 3×3 matrix:

$$\begin{bmatrix} -1 & 0 & 1 \\ -2 & 0 & 2 \\ -1 & 0 & 1 \end{bmatrix}.$$

Hence, after the luminance characteristic values with the 3×3 array are multiplied by the horizontal edge matrix filter and the vertical edge matrix filter respectively, both determinants are computed. This derives a horizontal characteristic value and a vertical edge characteristic value for the central pixel of a 3×3 array of the raw Bayer image data.

If the horizontal edge characteristic value is greater than both a threshold value and the vertical edge characteristic value, it is determined that an edge characteristic exists in the interested pixel and there is a horizontal edge. On the other hand, if the vertical edge characteristic value is greater than both the threshold value and the horizontal edge characteristic value, it is determined that an edge characteristic exists in the interested pixel and there is a vertical edge. In other conditions, it is determined that no edge characteristic exists in the interested pixel. Surely, there are still some other ways to carry out the edge analysis.

If the edge characteristic exists in the interested pixel, the edge enhancement unit 330 applies an edge enhancement filter to enhance corresponding pixel values in the edge orientation of the interested pixel. If not, the edge enhancement unit 330 outputs the interested pixel value directly.

For example, the edge enhancement filter is implemented with the following 1×5 matrix:

$$\begin{bmatrix} -\frac{1}{2} & 0 & 1 & 0 & -\frac{1}{2} \end{bmatrix}.$$

When the vertical edge characteristic exists in the interested pixel, the edge enhancement unit 330 read 5 vertical pixel values including the interested pixel value from the buffer 103 and then multiplies the 5 pixel values by the edge enhancement filter to generate the enhanced Bayer image data. Contrarily, when the horizontal edge characteristic exists in the interested pixel, the edge enhancement unit 330 read 5 horizontal pixel values including the interested pixel value from the buffer 103 and then multiplies the 5 pixel values by the edge enhancement filter to generate the enhanced Bayer image data. Instead, the edge enhancement filter can be applied to the interpolated RGB image data to generate the enhanced RGB image data by performing the matrix multiplication of the edge enhancement filter and the corresponding interpolated RGB image data. Based on the linear transformation relationship between RGB domain and YUV domain, similarly, the edge enhancement filter can be applied to the YUV image data to generate the enhanced YUV image data by performing the matrix multiplication of the edge enhancement filter and the corresponding YUV image data.

Figure 6:
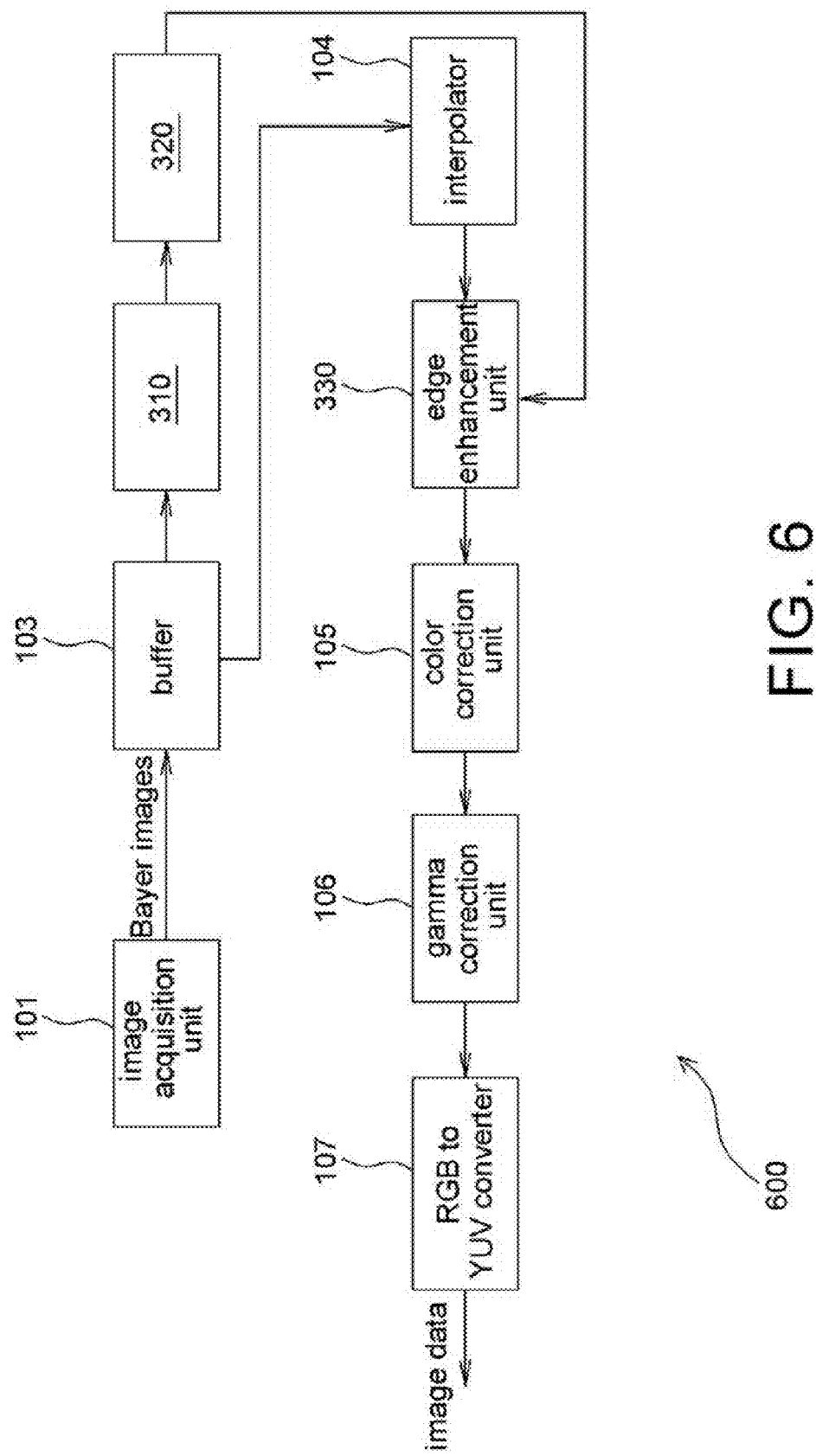
Figure 7:
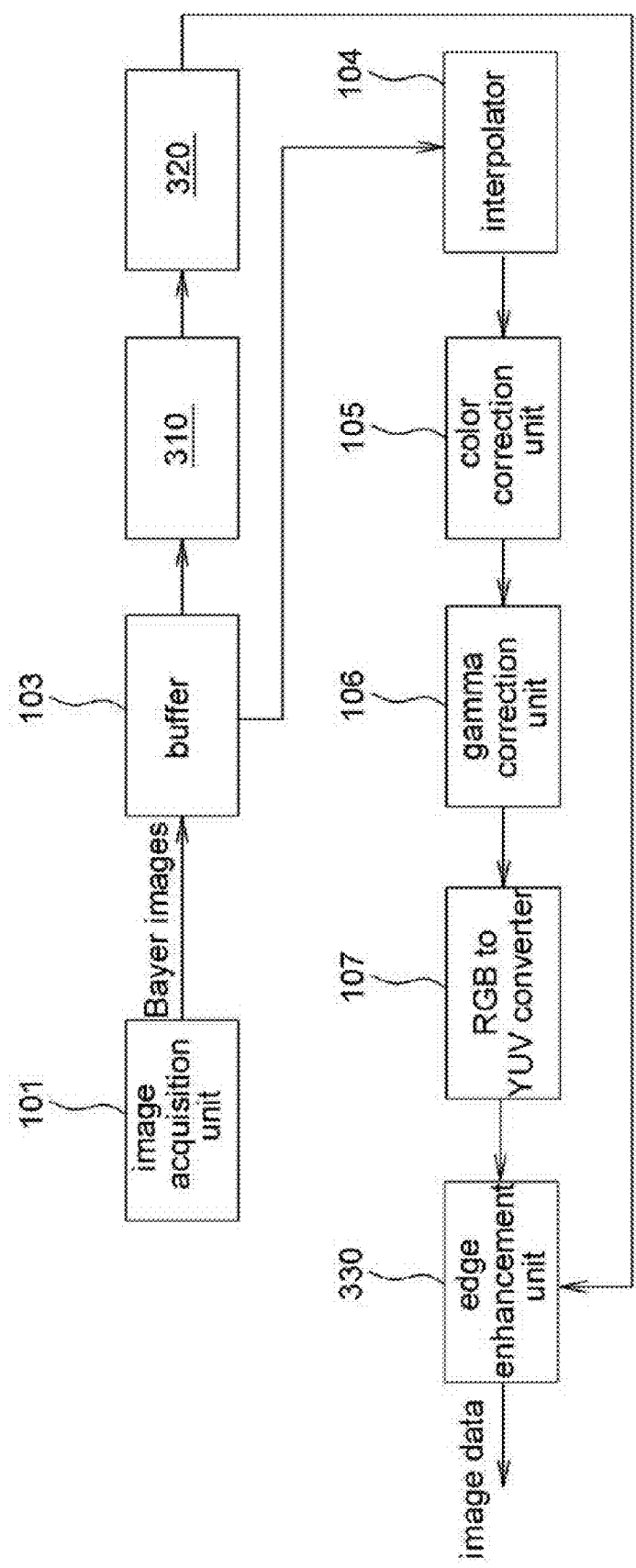

The edge enhancement unit 330 is applied to one of three stages in image processing pipeline (shown in FIG. 1B) to enhance corresponding pixel values in the edge orientation of the interested pixel. Stage 1: Apply the edge enhancement filter to the raw Bayer image data stored in the buffer 103. Stage 2: Apply the edge enhancement filter to the interpolated RGB image data (shown in FIG. 6). Stage 3: Apply the edge enhancement filter to the YUV image data (shown in FIG. 7).

Figure 4:
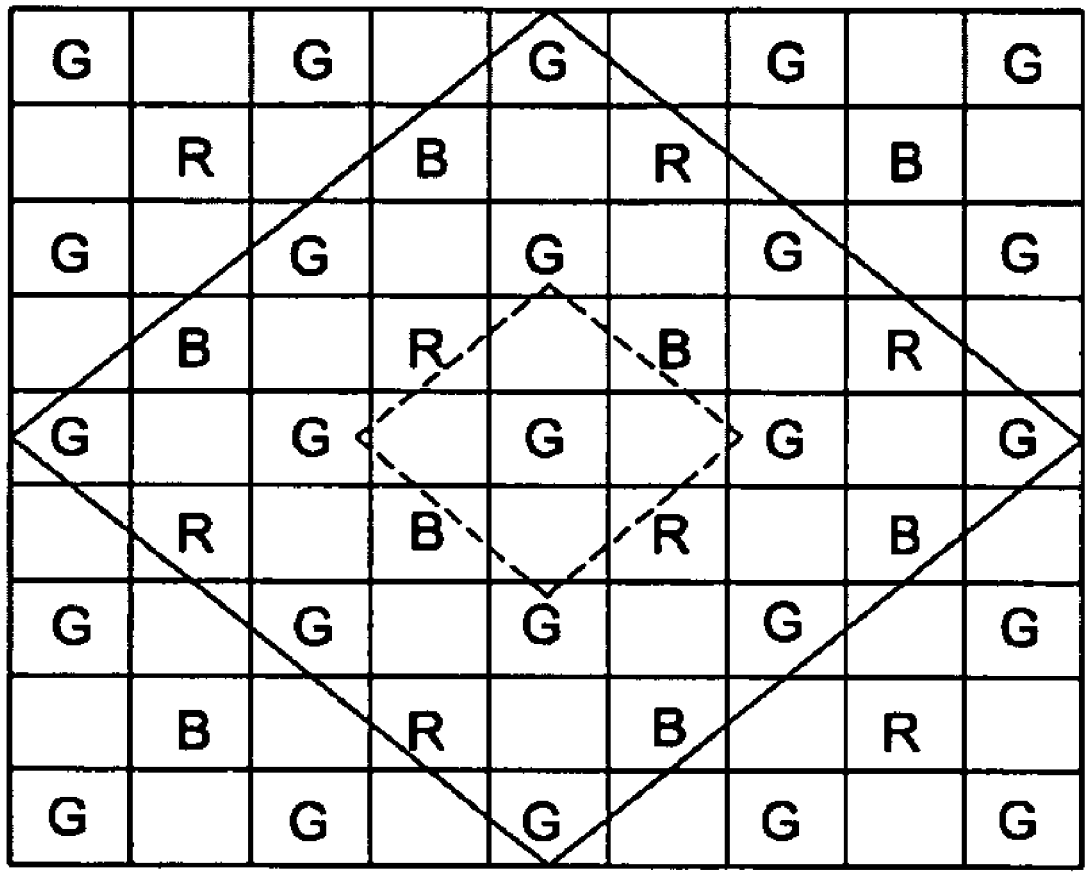
FIG. 4 is a diagram of the Fuji geometry for a color filter array.

It should be noted that there are several patterns for color filter array. The Bayer color filter array (shown in FIG. 1A) which filters R, G, B primary colors is the most popular pattern. The Bayer color filter array and the Fuji color filter array (as shown in FIG. 4) are preferably applied to the invention.

Figure 5:
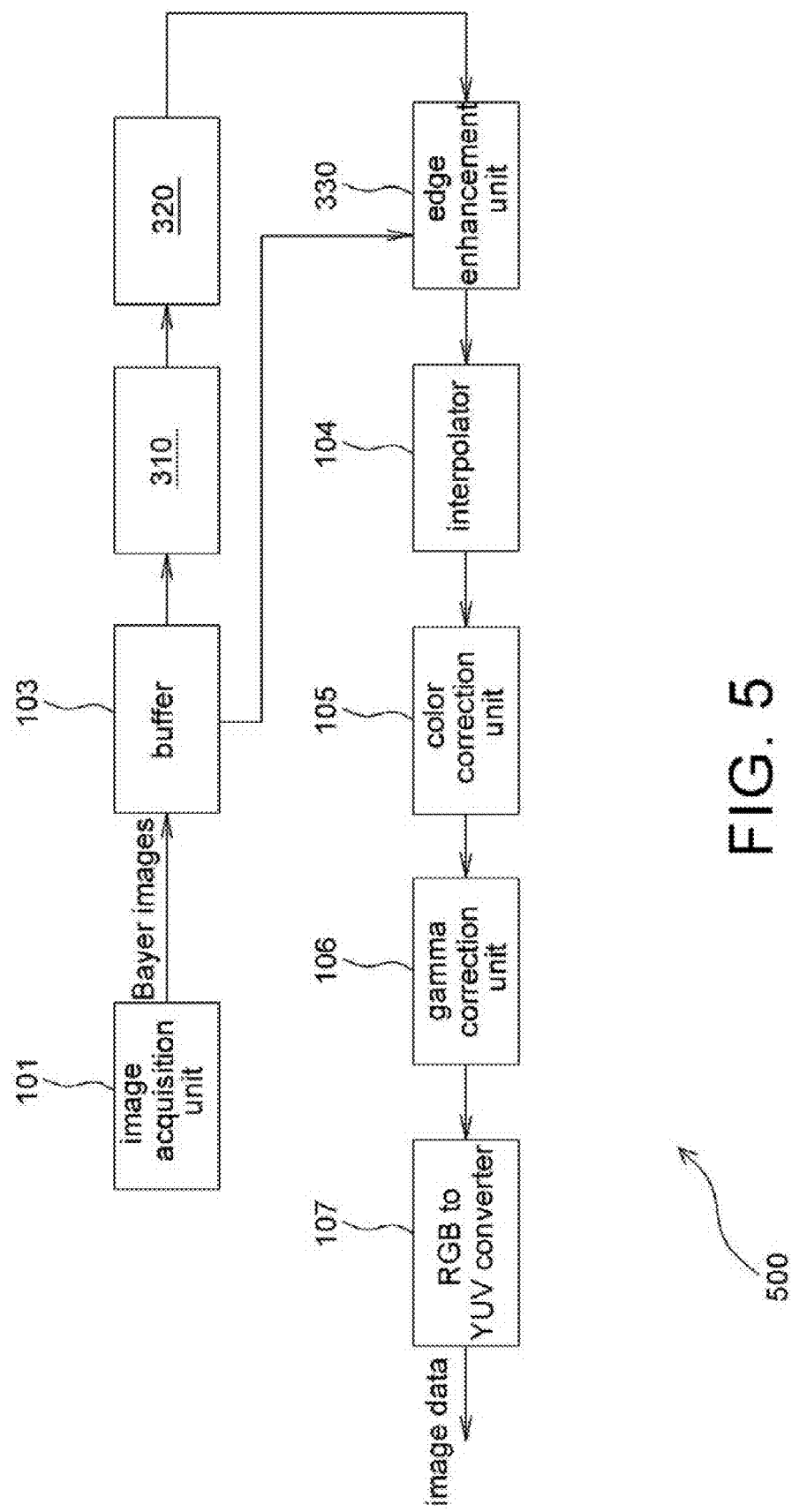
FIGS. 5-7 show block diagrams of color image acquisition systems according to three embodiments of the invention.

FIG. 5 shows a block diagram of an image acquisition system according to the invention. With referring to FIG. 5, the color image acquisition system 500 includes an image acquisition unit 101, a buffer 103, a luminance characteristic value generating unit 310, an edge analyzing unit 320, an edge enhancement unit 330, an interpolator 104, a color correction unit 105, a gamma correction unit 106 and a RGB to YUV converter 107.

The image acquisition unit 101 is used to capture image data, generate raw Bayer image data, and store the data into the buffer 103. The functions and structures of the buffer 103, the luminance characteristic value generating unit 310, the edge analyzing unit 320 and the edge enhancement unit 330 have been described in previous sections and are not to be explained anymore.

The interpolator 104 receives edge-enhanced Bayer image data, interpolates missing color values for each pixel according to the data of the pixel itself and its neighboring pixels, and finally generates RGB image data. Accordingly, the color correction unit 105 receives the RGB image data, then outputs the color correction data after performing color correction. The gamma correction unit 106 receives the color correction data, performs luminance correction by employing a predetermined function, and outputs the luminance correction data. Subsequently, the RGB to YUV converter 107 receives the luminance correction data and converts the RGB image data into the YUV image data for each pixel.

When the color image acquisition system 500 starts to work, the image acquisition unit 101 generates raw Bayer image data after capturing an image, and stores the image data into the buffer 103. At this moment, there is only one color at each pixel location. The luminance characteristic value generating unit 310 starts to generate the luminance characteristic values on condition that the amount of the image data stored in the buffer 103 is more than three pixel lines. On the other hand, ordinarily, five pixel lines are the minimum required to perform the interpolation operation in system 500; therefore, before five pixel lines are fully stored in the buffer 103 and then output for subsequent interpolation, each pixel of five pixel lines is already edge-enhanced (if edge enhancement performed at Stage 1). And, there is no delay during the entire procedure. Besides, the original capacity of the buffer 103 embedded in the image acquisition system 500 is enough for the computation of all luminance characteristic values and edge-enhanced image data. No additional memory space is needed.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An edge enhancement apparatus for Bayer images, comprising:
    a buffer for receiving and temporarily storing raw Bayer image data;
    a luminance characteristic value generating unit for reading the raw Bayer image data from the buffer, and generating luminance characteristic values for each interested pixel in accordance with all color signals of the raw Bayer image data, the interested pixel value and a plural of neighboring pixel values;
    an edge analyzing unit for receiving the luminance characteristic values, analyzing and determining if an edge characteristic and an edge orientation exist in the interested pixel in accordance with the luminance characteristic values of each interested pixel and a plural of neighboring pixels, wherein the edge analyzing unit further comprises a vertical edge matrix filter and a horizontal edge matrix filter for respectively calculating a vertical edge characteristic value and a horizontal edge characteristic value of each pixel; and
    an edge enhancement unit for receiving unenhanced image data, enhancing the pixel values in the edge orientation of the interested pixel if the edge characteristic exists in the interested pixel, and outputting edge-enhanced image data;
    wherein the luminance characteristic value generating unit comprises a matrix filter for generating the characteristic value of each pixel and a matrix implemented in the matrix filter is $$\begin{bmatrix} 1 & 2 & 1 \\ 2 & 4 & 2 \\ 1 & 2 & 1 \end{bmatrix}; \text{ and}$$

wherein the edge analyzing unit determines that a vertical edge characteristic exists in the interested pixel when the vertical edge characteristic value is greater than a threshold value and the horizontal edge characteristic value.

2. The edge enhancement apparatus as claimed in claim 1, wherein the raw Bayer image data is a Bayer color filter array image.

3. The apparatus as claimed in claim 1, wherein the raw Bayer image data is a Fuji color filter array image.

4. The edge enhancement apparatus as claimed in claim 1, wherein the edge analyzing unit determines that a horizontal edge characteristic exists in the interested pixel when the horizontal edge characteristic value is greater than the threshold value and the vertical edge characteristic value.

5. The edge enhancement apparatus as claimed in claim 1, wherein the edge analyzing unit determines that no edge characteristic exists in the interested pixel if the horizontal and the vertical edge characteristic values are less than the threshold value.

6. An edge enhancement apparatus for Bayer images, comprising:
    a buffer for receiving and temporarily storing raw Bayer image data;
    a luminance characteristic value generating unit for reading the raw Bayer image data from the buffer, and generating luminance characteristic values for each interested pixel in accordance with all color signals of the raw Bayer image data, the interested pixel value and a plural of neighboring pixel values;
    an edge analyzing unit for receiving the luminance characteristic values, analyzing and determining if an edge characteristic and an edge orientation exist in the interested pixel in accordance with the luminance characteristic values of each interested pixel and a plural of neighboring pixels; and
    an edge enhancement unit for receiving unenhanced image data, enhancing the pixel values in the edge orientation of the interested pixel if the edge characteristic exists in the interested pixel, and outputting edge-enhanced image data;
    wherein the luminance characteristic value generating unit comprises a matrix filter for generating the characteristic value of each pixel and a matrix implemented in the matrix filter is $$\begin{bmatrix} 1 & 2 & 1 \\ 2 & 4 & 2 \\ 1 & 2 & 1 \end{bmatrix};$$

wherein the raw Bayer image data is first interpolated to RGB image data and then converted into YUV image data, and the edge enhancement unit comprises an edge enhancement filter for enhancing the pixel values in the edge orientation of the interested pixel; and wherein the edge enhancement filter is applied to the raw Bayer image data for enhancing the pixel values in the edge orientation of the interested pixel in the raw Bayer image data and the unenhanced image data is the raw Bayer image data.

7. The edge enhancement apparatus as claimed in claim 6, wherein the raw Bayer image data is a Bayer color filter array image.

8. The edge enhancement apparatus as claimed in claim 6, wherein the raw Bayer image data is a Fuji color filter array image.

9. A color image acquisition system, comprising:
an image acquisition unit for capturing an image and outputting raw Bayer image data;
a buffer for receiving and temporarily storing the raw Bayer image data;
a luminance characteristic value generating unit for reading the raw Bayer image data from the buffer, and generating luminance characteristic values for each interested pixel in accordance with all color signals of the raw Bayer image data, the interested pixel value and a plural of neighboring pixel values;
an edge analyzing unit for receiving the luminance characteristic values, analyzing and determining if an edge characteristic and an edge orientation exist in the interested pixel in accordance with the luminance characteristic values of each interested pixel and a plural of neighboring pixels;
an edge enhancement unit for receiving the raw Bayer image data, enhancing the pixel values in the edge orientation of the interested pixel if the edge characteristic exists in the interested pixel, and outputting edge-enhanced image data;
an interpolator for receiving the edge-enhanced image data, interpolating all missing color values for each pixel, and generating RGB image data;
a color correction unit for receiving the RGB image data, performing a color correction for each pixel, and outputting color correction data;
a gamma correction unit for receiving the color correction data, performing a luminance correction for each pixel, and outputting luminance correction data; and
an RGB to YUV converter for receiving the luminance correction data and correspondingly converting the RGB image data to the YUV image data for each pixel;
wherein the luminance characteristic value generating unit comprises a matrix filter for generating the characteristic value of each pixel and a matrix implemented in the matrix filter is $$\begin{bmatrix} 1 & 2 & 1 \\ 2 & 4 & 2 \\ 1 & 2 & 1 \end{bmatrix}.$$

10. The color image acquisition system as claimed in claim 9, wherein the edge analyzing unit comprises a vertical edge matrix filter and a horizontal edge matrix filter for respectively calculating a vertical edge characteristic value and a horizontal edge characteristic value of each pixel.

11. The color image acquisition system as claimed in claim 10, wherein the edge analyzing unit determines that a vertical edge characteristic exists in the interested pixel if the vertical edge characteristic value is greater than a threshold value and the horizontal edge characteristic value.

12. The color image acquisition system as claimed in claim 11, wherein the edge analyzing unit determines that a horizontal edge characteristic exists in the interested pixel if the horizontal edge characteristic value is greater than the threshold value and the vertical edge characteristic value.

13. The color image acquisition system as claimed in claim 12, wherein the edge analyzing unit determines that no edge characteristic exists in the interested pixel if the horizontal and the vertical edge characteristic values are less than the threshold value.

14. The color image acquisition system as claimed in claim 9, wherein the edge enhancement unit comprises an edge enhancement filter for enhancing the pixel values in the edge orientation of the interested pixel.

* * * * *